G. C. CHASE.
CALCULATING MACHINE.
APPLICATION FILED MAR. 20, 1915.
1,329,262.
Patented Jan. 27, 1920.
7 SHEETS—SHEET 1.
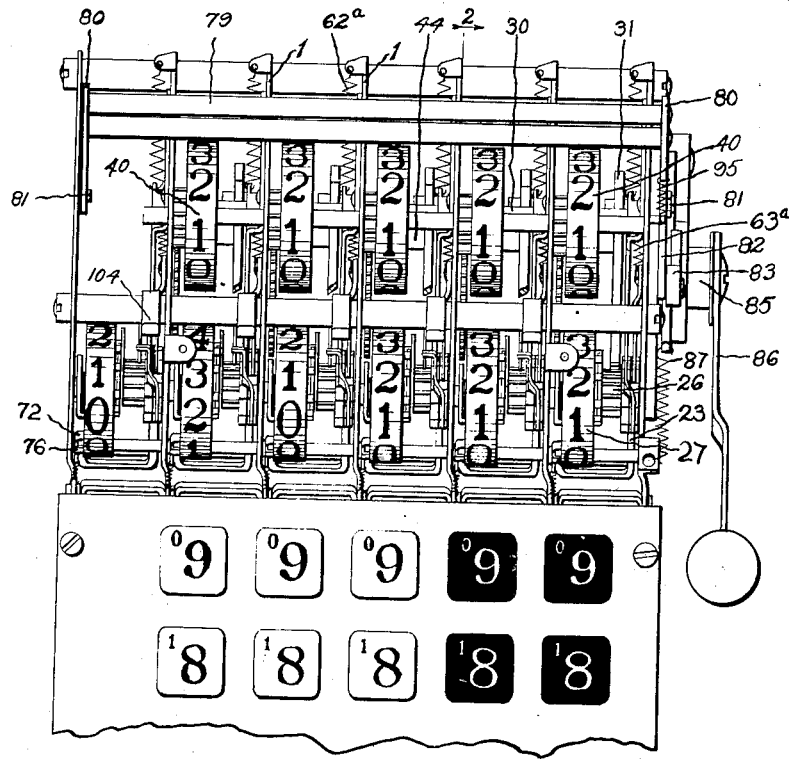
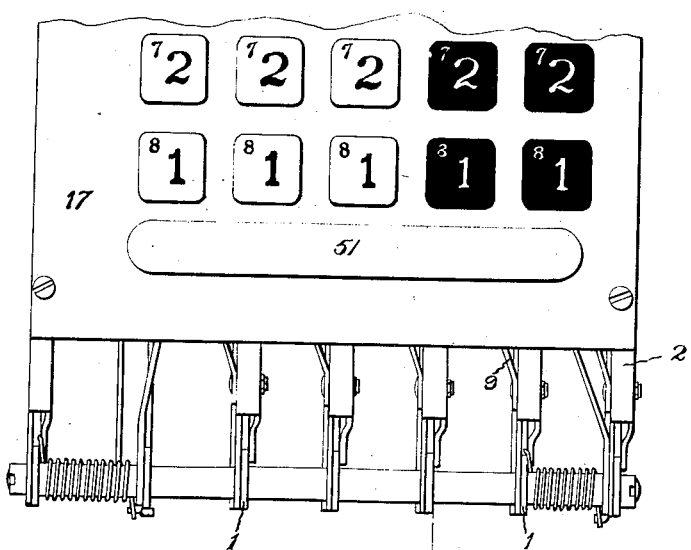
Fig. 1
Witnesses
J. H. Thurston
E. C. Alford
Inventor
George C. Chase,
per Wilmarth H. Thurston
Attorney

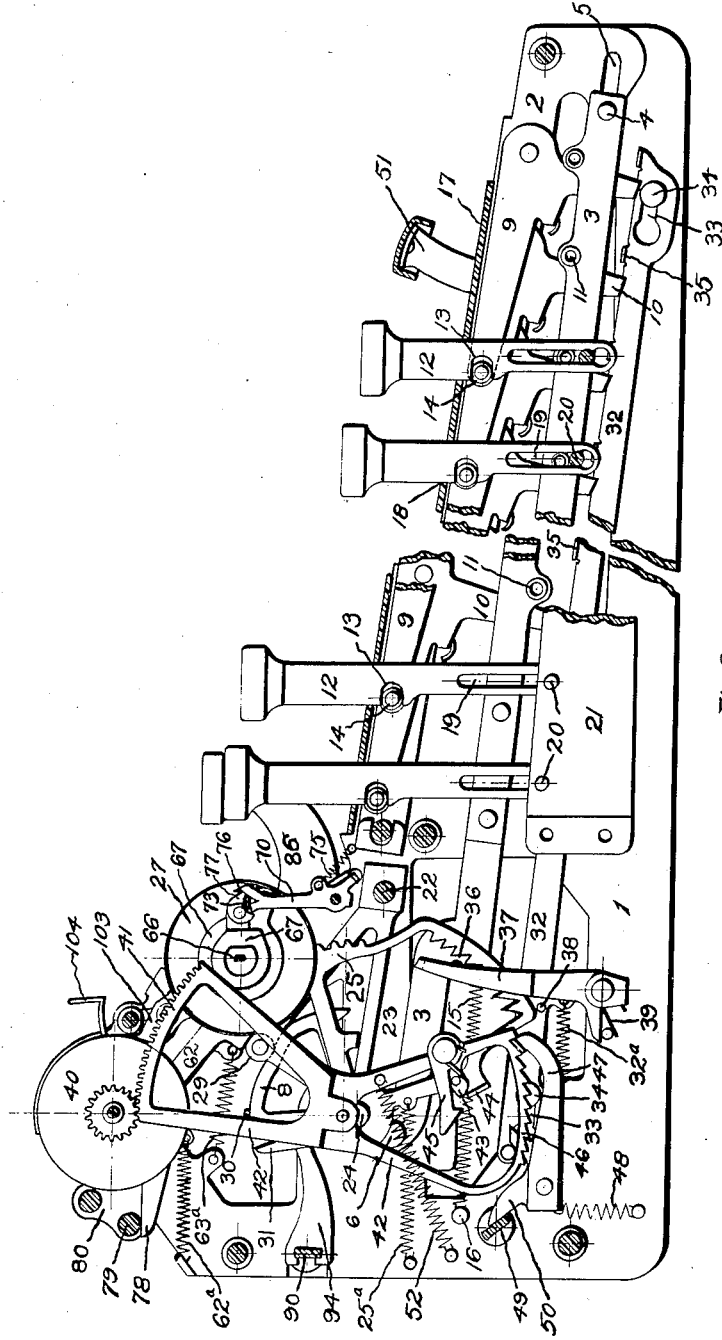

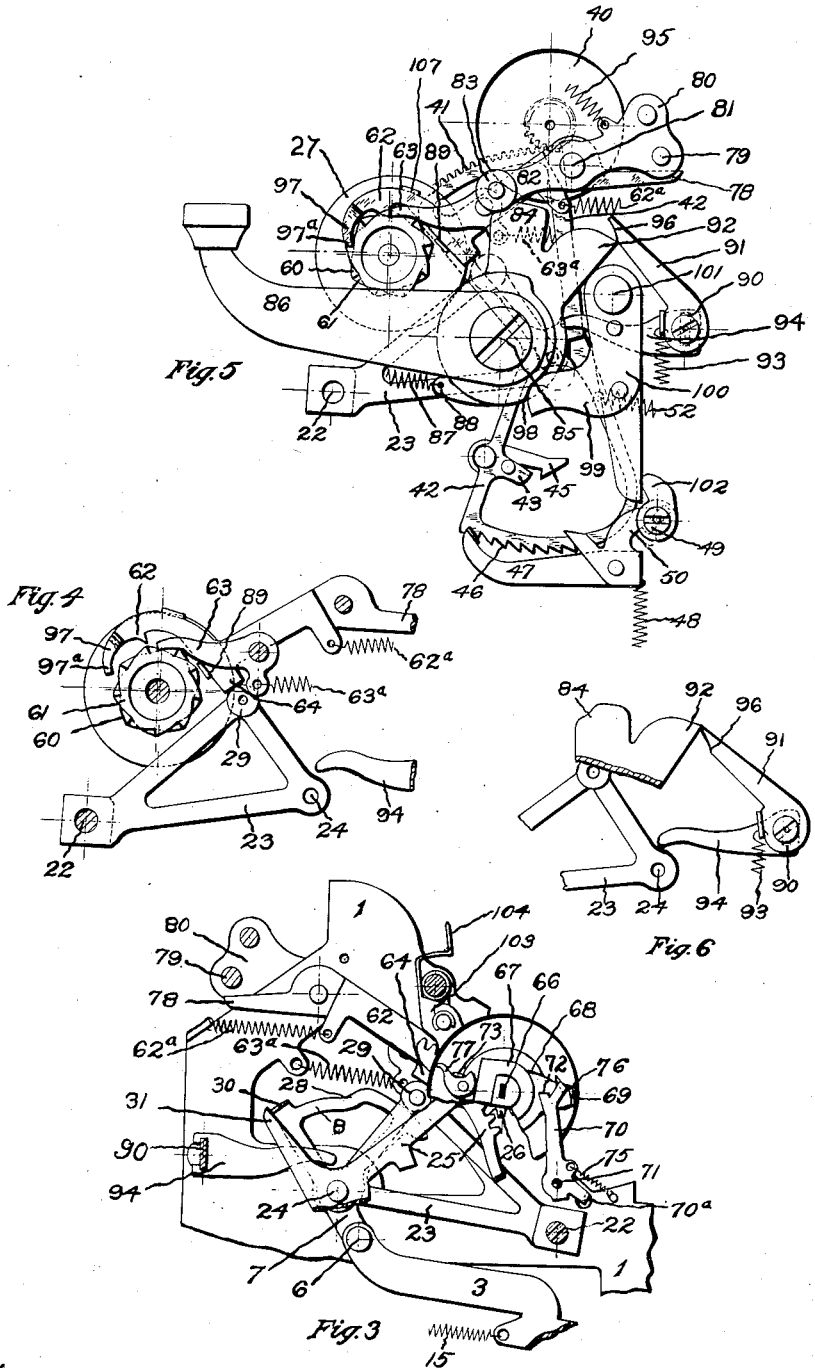

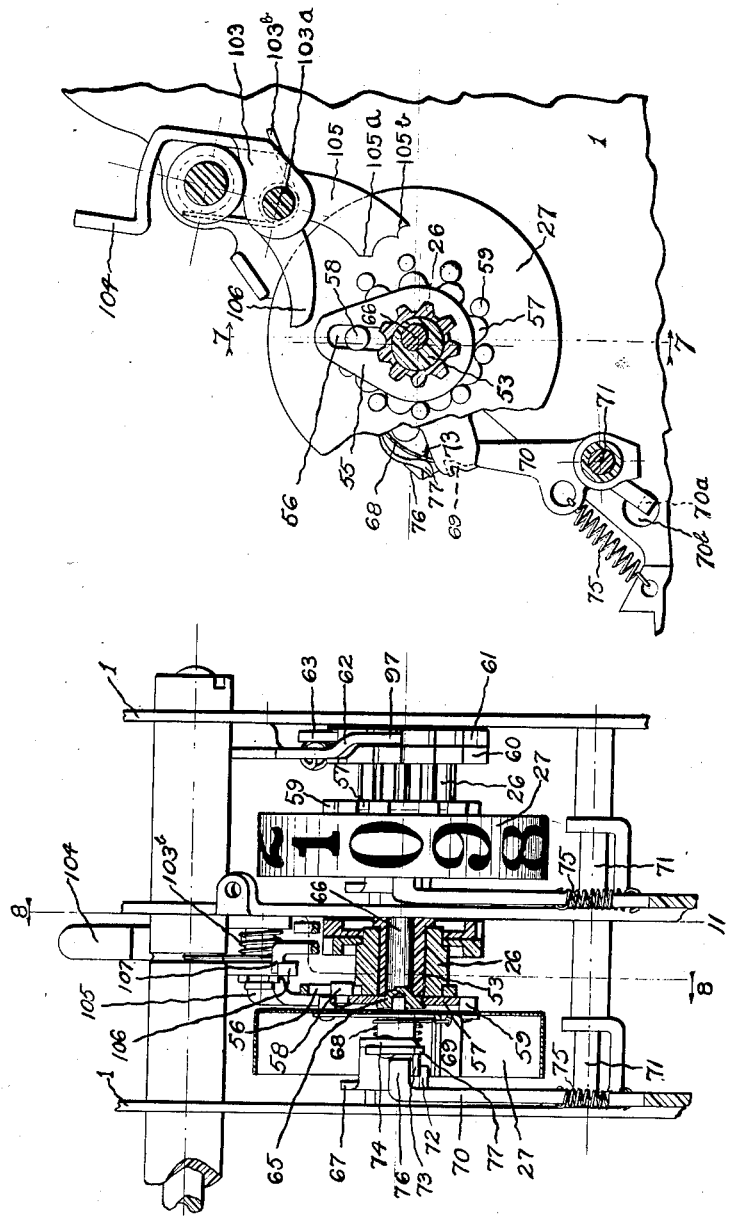

G. C. CHASE.
CALCULATING MACHINE.
APPLICATION FILED MAR. 20, 1915.

1,329,262.

Patented Jan. 27, 1920.
7 SHEETS—SHEET 5.

Witnesses
J. H. Thurston
E. C. Alford

Inventor
George C. Chase,
per Wilmarth H. Thurston
Attorney

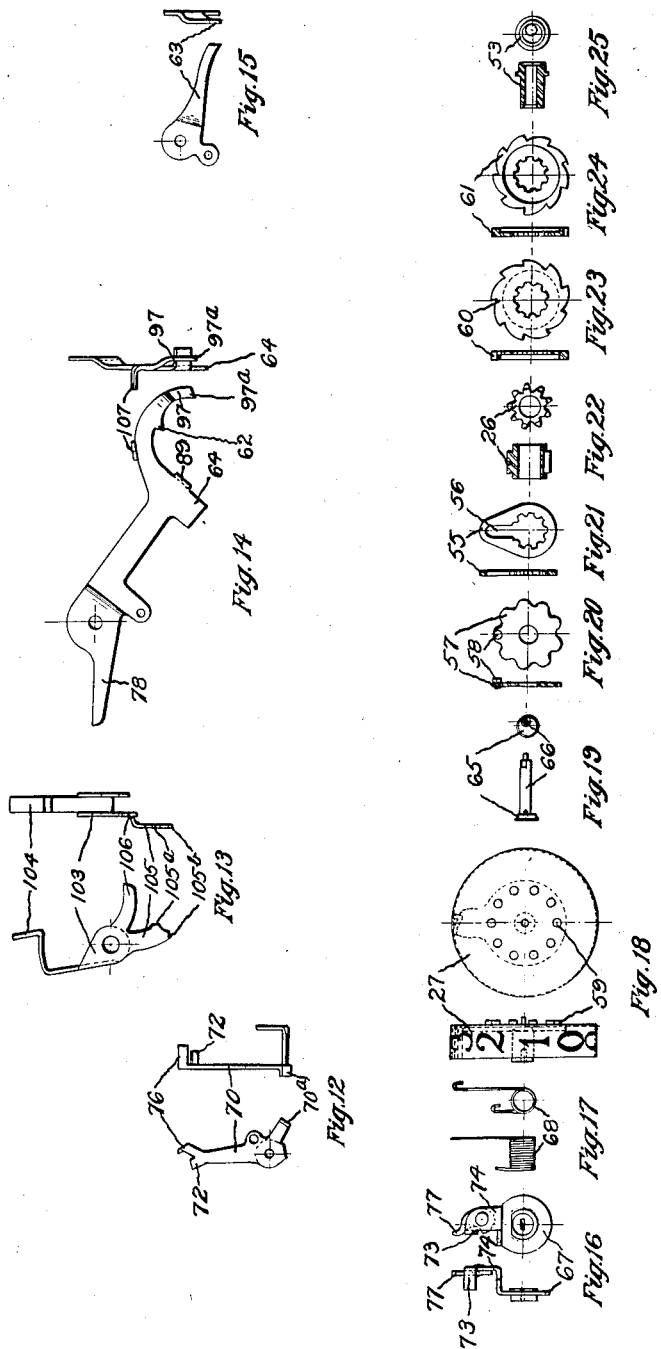

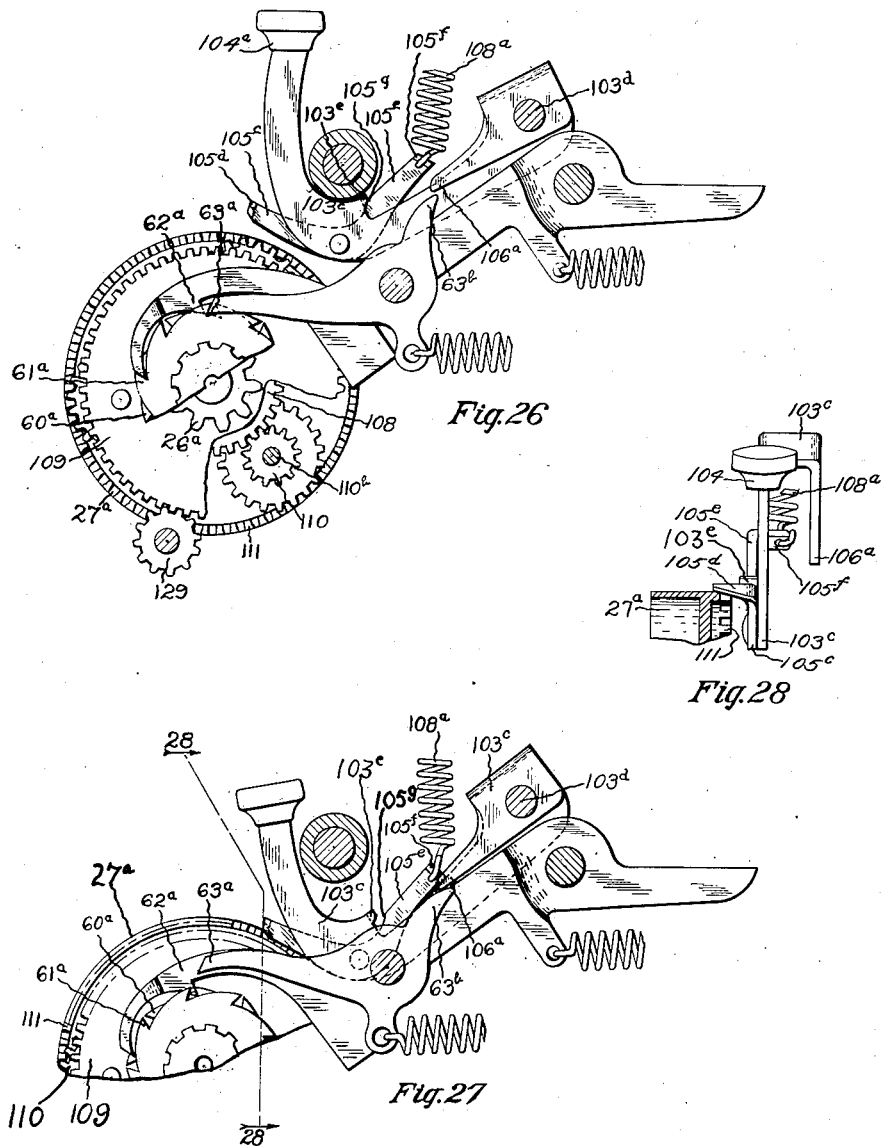

UNITED STATES PATENT OFFICE.

GEORGE C. CHASE, OF PROVIDENCE, RHODE ISLAND.

CALCULATING-MACHINE.

1,329,262.  Specification of Letters Patent.  Patented Jan. 27, 1920.

Application filed March 20, 1915. Serial No. 15,689.

*To all whom it may concern:*

Be it known that I, GEORGE C. CHASE, a citizen of the United States, residing in the city and county of Providence and State of Rhode Island, have invented certain new and useful Improvements in Calculating-Machines; and I do hereby declare the following specification, taken in connection with the accompanying drawings, forming a part of the same, to be a full, clear, and exact description thereof.

The present invention relates to calculating machines and certain features of the invention are applicable both to key-actuated and to key-set machines, and to the various forms of each of these types of machines.

One object of the invention is to provide a registering mechanism which will permit two or more dials or numeral-wheels to be rotated simultaneously by their actuators, and which also permits one or more of said dials or numeral-wheels to be actuated by the carrying mechanism simultaneously with the rotation thereof by their actuators and without the carrying movement becoming merged or lost in the movement imparted by said actuators.

The invention also has for its object to provide an improved construction of clearing or zero-setting mechanism for clearing the dials or numeral-wheels or returning them to zero when so desired, and also to provide a novel form of subtraction cut-off for preventing carrying to the column at the left in performing problems of subtraction.

The invention further consists in certain constructions and combinations of parts hereinafter described and set forth in the claims.

Referring to the drawings,—

Figure 1 is a plan view of the machine with the casing removed.

Fig. 2 is a view of the same partly in side elevation and partly in vertical section on line 2—2 of Fig. 1.

Fig. 3 is a detail of a portion of the key-actuating mechanism, showing the parts in a position effected by key-actuation.

Fig. 4 is a detail of the pawl and ratchet mechanism for holding the numeral-wheel against rotation.

Fig. 5 is a side elevation of the clearing or zero-setting mechanism.

Fig. 6 is a corresponding view of a portion of the clearing mechanism showing the parts in locked position.

Fig. 7 is a view on an enlarged scale showing the numeral-wheel in the units column and its operating parts in front elevation and showing the numeral-wheel in the tens column and its operating parts in section on the line 7—7 of Fig. 8.

Fig. 8 is a section on the line 8—8 of Fig. 7.

Figure 9:
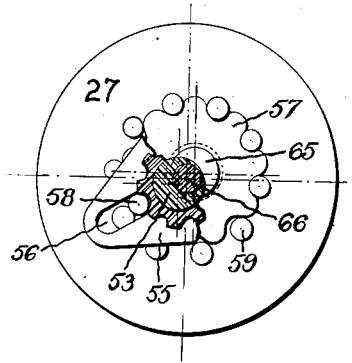
Figs. 9 and 10 are details of the carrying mechanism on an enlarged scale.
Figure 10:
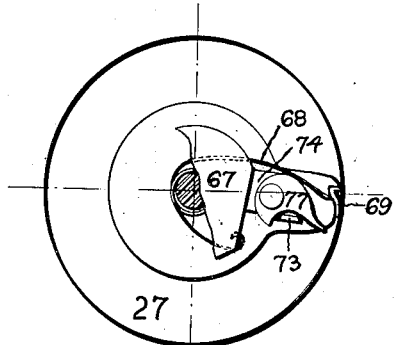

Figs. 12 to 25 inclusive are detail views showing the different parts, some of said parts being shown in front elevation and in side elevation and others of said parts being shown in side elevation and in section.

Fig. 26 is a side view of the subtraction cut-off mechanism applied in a modified form to a planetary gear carrying mechanism.

Fig. 27 is a side view of the same showing the position of the parts when the subtraction cut-off lever is depressed.

Fig. 28 is a front view partly in elevation and partly in section on line 28—28 of Fig. 27.

The machine shown and described in the drawings is similar in its general construction and organization to that shown and described in the patent to J. A. Turck, No. 720,086, dated February 10, 1903. It will be necessary, therefore, to describe the general construction of the machine only briefly, except so far as the machine shown in the drawings differs in its construction from the machine shown and described in said Turck patent.

*Key-actuating mechanism.*—The machine consists of a series of sections extending from front to rear and parallel with each other. Each section has a frame or plate 1 which supports the key-bar 2 and the operative parts of the mechanism. A sliding or reciprocating bar 3 is adapted to be moved longitudinally, first in one direction and then in the other. The front end of said bar is provided with a pin or roll 4 which enters a slot 5 formed in a downward projection of the key-bar 2. The rear end of said sliding bar 3 is pivotally connected at 6 to an arm 7 preferably formed integral with the cam-member 8, which is pivoted to the frame 1.

A series of levers 9, one for each key, are pivoted to the key-bar 2, each of said levers having a downwardly projecting arm 10 adapted to engage a roll 11 carried by the sliding bar 3. In the present construction the keys 12, instead of being formed integral with the levers 9, are formed separately therefrom and are arranged to move vertically. Each key is provided with an open ended slot 13 which embraces a roller 14 mounted at the rear end of each lever 9. With this construction a depression of any one of the keys will serve to turn the corresponding lever 9 about its pivot and thus to move the sliding bar 3 toward the front of the machine. The return movement of said sliding bar is effected by a spring 15, one end of which is connected to said sliding bar and the other end to a stud 16 secured to the frame 1.

A plate 17 overlies the several key-sections making up the machine, which plate is provided with a series of elongated apertures 18, one for each of the keys 12, and in which the upper ends of the keys are guided in their vertical movements. For the purpose of guiding the lower end of the key each key is provided with a slot 19 which embraces a stud 20 carried by a plate 21 secured to the frame 1. Pivoted to the frame 1 at 22 is an oscillating bracket 23 preferably of a triangular truss construction, as shown. Pivoted at 24 on the bracket 23 is the actuating segment gear 25, which meshes with the driving pinion 26 for rotating the numeral-wheel 27. Normally the segment gear 25 is out of engagement with the driving pinion 26, but is adapted to be moved into engagement therewith. For this purpose the cam-member 8 is provided with a cam-surface 28 which is adapted to engage a roll 29 carried by the oscillating bracket 23. Said cam-member 8 is also provided with a lug 30 which is adapted to engage an arm 31 formed integral with or secured to the segment gear 25.

With this construction, when the sliding bar 3 is moved toward the front of the machine, or to the right in Fig. 2, by the depression of any one of the keys in that column, the cam-member 8 will thereby be turned about its pivot. The first movement of said cam-member will, by the action of the cam-surface 28 on the roll 29, serve to move the segment gear 25 into engagement with the driving pinion 26, while the further movement of said cam-member will serve by the engagement of the lug 30 with the arm 31 to turn said segment gear about its pivot and thereby rotate the driving pinion and the numeral-wheel. As will be understood, the sliding bar 3 will be moved to a varying extent according to which key is depressed, and consequently the segment-gear and the numeral-wheel will be turned a distance corresponding to the number of the key depressed. As will also be understood, when the key is released, the sliding bar 3 will be moved to the rear, or to the left in Fig. 2, by the action of the spring 15, thereby turning the cam-member 8 in the opposite direction and permitting the oscillating bracket 23 and the segment gear 25 carried thereby to drop, the segment gear being turned about its pivot and thus returned to its normal position by the action of a spring $25^a$ connected therewith.

Means are provided for limiting the downward movement of each key for preventing the over-rotation of the numeral-wheel under key-actuation. The means shown in the drawings is similar to that shown in the Turck patent referred to, but embodies certain features of improvement thereon. A second sliding or reciprocating bar 32 is mounted on the frame 1, said bar being provided at each end with a slot 33 embracing a stud 34 secured to the frame 1. Said bar is provided with a series of lugs 35, one for each key, said lugs being located in position to be engaged by the lower ends of the arms 10 of the levers 9. The segment gear 25 is provided with a series of teeth 36. In the construction shown these teeth are internal teeth formed on one arm of the segment gear 25, which, as shown, is of an open truss formation.

Pivoted to the frame 1 is a pawl 37 adapted to engage one or another of the teeth 36. The sliding bar 32 carries a stud 38 adapted to engage the rear edge of said pawl 37. As will be understood, when the lower end of the arm 10 of the lever 9 engages a lug 35 of the sliding bar 32, the further movement of such lever 9, when actuated by its key, will serve to move the sliding bar 32 toward the front of the machine, or toward the right in Fig. 2, and so that by the engagement of the pin 38 with the pawl 37 said pawl will be moved into engagement with that one of the teeth 36 which corresponds to the key which has been depressed, thereby limiting further downward movement of said key and at the same time preventing over-rotation of the numeral-wheel. Preferably the teeth 36 are eight in number as shown, the radial arm of the segment gear 25 serving as the ninth abutment to be engaged by the pawl 36. A spring 39 serves to return the pawl 37 to its normal position, and a spring $32^a$ serves to return the sliding bar 32 to its normal position.

Each section of the machine is provided with a proof-dial or numeral-wheel 40. The mechanism for actuating these proof-dials and for clearing the same or returning them to zero is similar to that shown and described in said Turck patent, but with certain features of improvement thereon. The mechanism for actuating the proof-dial 40 comprises the segment gear 41 formed on a trussed frame 42 which carries a lug 43 which engages a lug 44 formed on the frame of the segment gear 25, the construction being such that, when the segment gear is actuated to rotate the numeral-wheel 27, the segment gear 41 will be correspondingly actuated to rotate to the same extent the proof-dial 40. A latch 45 pivoted to the member 42 is adapted to engage the lug 44 and thereby prevent over-rotation of the proof-dial 40.

The member 42 is provided at its lower end with a series of teeth 46 adapted to be engaged by a pivoted pawl 47. A spring 48 serves to keep said pawl normally in engagement with said teeth. When the proof-dial or numeral-wheel 40 is rotated by the segment gear 41, the frame-member 42 will be turned to bring into engagement with the pawl 47 one of the teeth 46 which corresponds to the key which has been depressed, and the engagement of said pawl with such tooth will serve to hold the numeral-wheel 40 in the position to which it has been moved until said pawl is moved out of engagement.

The mechanism for clearing or returning to zero the proof-dials or numeral-wheels 40 comprises a rock-shaft 49 arranged to engage arms 50 projecting from the pawls 47. There are connections between said rock-shaft 49 and the clearing bar 51 which are not shown, whereby by the depression of said clearing bar said rock-shaft will be oscillated to withdraw all of the pawls 47, whereupon the frames 42 will be oscillated by the action of the springs 52 so as to rotate the proof-dials or numeral-wheels 40 in the opposite direction and return the same to zero.

The driving pinion 26, which is shown as a nine-tooth pinion, is mounted to rotate on a stud 53, rigidly secured to the frame 1. This driving pinion 26, instead of being directly connected to the numeral-wheel 27, is connected thereto in the following manner:—Rigidly secured to the pinion 26 so as to rotate therewith is an arm 55, said arm being provided with an elongated slot 56. Mounted concentric with the pinion 26 is a gear 57, which, in the construction shown, is also provided with nine teeth. Secured to said gear 57 and projecting therefrom is a pin 58 which enters the slot 56 in the arm 55, as shown in Figs. 7 and 8. The teeth of the gear 57 mesh internally with pins 59 secured to the numeral-wheel 27, as shown in Fig. 8, said pins being ten in number and constituting a ten-tooth gear. As shown in Fig. 8, the center of the nine-tooth gear 57 and the center of the numeral-wheel carrying the ten pins or ten-tooth gear are eccentric to each other. With this construction, when the driving-pinion 26 is rotated by the actuation of any one of the keys in that column, the numeral-wheel will be turned the proper distance by the connections above described. In the units column the nine-tooth gear 57 may be connected directly to the nine-tooth pinion 26, as shown at the right in Fig. 7.

Secured to the driving pinion at the other side thereof are two ratchet-wheels 60 and 61, the ratchet-wheel 60 being adapted to be engaged by the pawl 62 to prevent forward rotation of the numeral-wheel and the ratchet-wheel 61 being adapted to be engaged by the pawl 63 to prevent backward rotation of said numeral-wheel. When the numeral-wheel is to be rotated, it is necessary to lift the pawl 62 out of engagement with the ratchet-wheel 60 and for this purpose the pawl 62 is provided with a projection 64 arranged to be engaged by the upper end of the oscillating bracket 23, as best shown in Fig. 4. As shown in Fig. 4, with the pawl 62 lifted far enough to clear the teeth of the ratchet-wheel 60, the pawl 63 remains in position to engage the teeth of the ratchet-wheel 61, and so as to prevent any backward rotation of the numeral-wheel. The pawl 62 is normally held in engaging position by a spring $62^a$ and the pawl 63 is normally held in engaging position by a spring $63^a$.

*Carrying mechanism.*—A characteristic feature of the carrying mechanism is that it embodies what may be termed a shifting gear. In the construction shown, the nine-tooth gear 57 in all the columns above the units column constitutes such shifting gear. Said gear 57 is mounted upon the eccentric head 65 of a shaft 66, which may be termed the carrying shaft, and which is eccentrically mounted in a stud 53, as shown in Figs. 7, 8 and 9. These two eccentricities are equal, and, with the parts in normal position and in the position which they occupy during key-actuation, the two eccentricities are oppositely arranged, and so that the one eccentricity offsets or neutralizes the other, with the result that, as hereinbefore stated, the axis of the shifting gear 57 in key actuation is concentric with the axis of the driving pinion 26.

In the operation of the carrying mechanism the carrying shaft 66 is to be rotated. The mechanism for rotating this carrying shaft 66 when carrying is to take place is similar to that shown and described in my Patent No. 1,011,156, dated December 12, 1911, to which reference may be had for a detail description of the same, the present construction, however, embodying certain modifications to be referred to. Secured to the opposite end of the carrying shaft 66 is a disk 67 which may be termed a carrying disk, said disk being thus mounted to rotate with said carrying shaft, instead of being rotatably mounted on the hub of the numeral-wheel as in the construction shown in said prior patent. The carrying spring 68 is connected at one end to the numeral-wheel, preferably by being hooked into the cam 69 secured to said numeral-wheel, and has its other end connected to the carrying disk 67, and so that said carrying spring may be wound up by the rotation of the wheel of lower order in passing from 0 to 9, the carrying disk 67 being at this time held against rotation. For the purpose of holding said carrying disk against rotation, a detent lever 70 pivoted at 71 is provided, said detent lever being provided with a projection or detent finger 72 adapted to engage a projection 73 on an arm 74 carried by the disk 67. Said detent lever 70 is normally held in engaging position by a spring 75. The movement of said detent lever 70 under the action of its spring is limited by the engagement of the bent end of an arm 70$^a$, preferably formed integral with said detent lever, with the wall of the aperture 70$^b$ in the frame, as shown in Fig. 8.

For the performance of the carrying operation, it is necessary that the carrying spring 68, after being wound up by the rotation of the numeral-wheel of lower order from 0 to 9, shall be released as said numeral-wheel passes from 9 to 0. For this purpose the detent lever 70 is provided with a second projection in the form of a cam-face 76, which normally lies in the path of the cam 69 carried by the numeral-wheel. The arrangement of these parts is such that as the numeral-wheel passes from 9 to 0 the cam 69 will ride up the cam-face 76, thereby depressing the inner end of the detent lever and moving the detent finger 72 out of engagement with the projection 73, and thus releasing the carrying disk 67, which thus becomes free to rotate under the action of the carrying spring 68.

If for any reason the carrying spring should at any time become sluggish in its action, and so that it should fail to move the projection 73 past the detent finger 72 before the detent lever is returned to its normal position by the action of its spring, the carrying disk might become blocked against rotation and the carrying operation therefore not performed. To guard against this possibility a guard 77 is mounted on the arm 74 in position to have the free end thereof engaged by the cam 69 on the numeral-wheel, and so that during the latter part of the movement of the numeral-wheel from 9 to 0 the engagement of said cam 69 with the guard 77 will serve to positively move the projection 73 past and beyond the detent finger 72 and so that the carrying disk 67 will thus be sure to be free to be rotated by the action of the carrying spring. With this construction, if the carrying spring for any reason should fail to act, the cam 69 will remain in engagement with the guard 77, and as the numeral-wheel of lower order is again moved from 0 to 9 the carrying disk 67 will be positively turned by the rotation of said numeral-wheel, and so as thus to positively effect the carrying to the wheel of higher order, to insure the returning of the detent lever 70 to its normal position under the action of its spring, the outer edge of the projection 73 will come in contact with the edge of the cam projection 76 and acting thereon will serve to positively move the detent lever 70 and thus return the same to normal position.

The rotation of the carrying disk 67 under the action of the carrying spring serves to impart rotation to the carrying shaft 66. The rotation of said carrying shaft will, by the action of the eccentric head 65, serve to shift the nine-tooth gear 57, that is, will serve to carry the axis of said nine-tooth gear around the axis of the numeral-wheel, and so that the teeth of said nine-tooth gear will be caused to successively engage the ten pins or teeth of the numeral-wheel, and thereby serve to turn the numeral-wheel one step or one-tenth of a revolution as the carrying disk makes one complete rotation under the action of the carrying spring. As will be understood, the shifting of the nine-tooth gear 57 in the manner described is permitted by the slot 56 in the arm 55, in which slot the pin 58, which projects from said nine-tooth gear, is located, said pin traveling back and forth in said slot as the nine-tooth gear is shifted by the rotation of the eccentric head on the carrying shaft. The engagement of the pin 58 on the nine-tooth gear with the slot 56 in the arm 55 also serves to hold the nine-tooth gear against rotation about its own axis as it is shifted by the rotation of the eccentric head referred to, and as will be understood it is because said nine-tooth gear is thus held against turning as it is shifted that the successive engagement of the teeth of the nine-tooth gear with the pins or teeth of the numeral-wheel serves to turn the numeral-wheel instead of turning the nine-tooth gear itself.

With the construction of carrying mechanism above described, it is immaterial whether the numeral-wheel of higher order is or is not being rotated under the action of its key-actuating mechanism at the time the carrying mechanism operates. The shifting of the nine-tooth gear and the consequent one-step rotation of the numeral-wheel may take place at the same time that said nine-tooth gear is being rotated by its key-actuating mechanism, and the shifting of said nine-tooth gear will become effective to impart a carrying movement to the numeral-wheel of higher order even though said numeral-wheel is at the same time being rotated by the rotation of the ninth-tooth gear produced by the rotation of the nine-tooth driving pinion. With this construction, therefore, two or more numeral-wheels may be simultaneously actuated and at the same time the carrying from one wheel to the other will be properly effected and without the carrying operation becoming lost or merged in the movement imparted to the higher numeral-wheel by its own actuator.

*Clearing mechanism.*—In the construction shown the clearing of the numeral-wheels, that is, the setting of said wheels to zero, is effected by the same springs which serve to actuate the carrying mechanisms, viz., the springs 68 above referred to. When the numeral-wheels are to be returned to 0, it is necessary that all of the pawls 63 which engage the ratchet-wheels 61 and normally prevent backward rotation of the numeral-wheels shall be lifted out of engagement with their ratchet-wheels, and it is also desirable that at this time the pawls 62 shall likewise be lifted out of engagement with their ratchet-wheels, in order to lessen the work of the carrying springs in returning the numeral-wheels to 0, and means are provided for so lifting said pawls out of engagement with their ratchet-wheels.

In the construction shown, each of the pawls 62 is provided with a rearwardly extending arm 78. Extending across the machine and overlying the rear ends of said arms 78 is a cross-bar 79 secured to rock-arms 80, 80, pivoted to the outside frame at 81, 81, respectively. At one side of the machine the rock-arm 80 is provided with a forward extension 82 carrying a roller 83. Said roller 83 is adapted to be engaged by a cam 84 pivoted to the frame at 85. Connected to said cam 84 for actuating the same is a key-lever 86. A spring 87 is connected to an arm 88 preferably formed integral with the cam 84 for holding said cam and the connected key-lever 86 in normal position.

When the numeral-wheels are to be returned to 0, the operator depresses the key-lever 86, thereby turning the cam 84 which by its action on the roller 83 serves to turn the connected rock-arms 80, 80 and depress the cross-bar 79, thereby depressing the rearward extensions 78, and thus lifting the pawls 62 out of engagement with their ratchet-wheels. Each of the pawls 62 is provided with a lateral projection 89 which underlies the companion pawl 63 as shown in Figs. 4 and 5, and so that when the pawls 62 are lifted by the mechanism above described the pawls 63 will likewise be lifted out of engagement with their ratchet-wheels.

As will be understood, the tension given to each of the carrying springs as it is wound up by the turning of the numeral-wheel from 0 toward 9 tends to rotate the connected numeral-wheel backward. Consequently, when the pawls 62 and 63 are lifted out of engagement with their ratchet-wheels, the numeral-wheels will all be free to be turned backward by their carrying springs and thereby returned to 0. As will be understood, the opposite end of each carrying spring is at this time held by the engagement of the projection 72 on the detent lever 70 with the projection 73 on the carrying disk. The backward rotation of each numeral-wheel when it arrives at 0 will be arrested by the engagement of the rear side of the cam 69 with the lower edge of the cam-face 76.

It is possible that by very quick depression and release of the key-lever 86 the pawls 62 and 63 might be released before the numeral-wheel had been completely returned to 0, and thus prevent any further return movement of the numeral-wheel. To guard against this, means are provided whereby, when said pawls 62 and 63 are moved out of engaging position by the depression of the key-lever 86, said pawls will be locked and held out of engagement until the next depression of an actuating key, and whereby the next depression of any actuating key will serve to unlock and release said pawls.

Pivotally mounted in the main frame and extending across the machine is a cross-bar 90. Secured to said cross-bar 90 at that side of the machine where the key-lever 86 is located is an arm 91 which normally rests upon a lug 92 preferably formed integral with the cam 84, as shown in Fig. 5. A spring 93 serves to hold said arm and cross-bar in their normal position. When the key-lever 86 is depressed and the cam 84 thereby turned, the lug 92 will be moved out from under the end of the arm 91, thereby permitting said arm to be pulled downward by its spring 93, so as to bring the free end of the arm 91 back of the lug 92, thereby locking the cam 84 in the position to which it has been moved by the depression of the key-lever 86, and thus locking the cross-bar 79 in its depressed position and holding the pawls 62 and 63 disengaged from their respective ratchet-wheels.

Secured to the cross-bar 90 is a series of arms 94, one for each column of the machine. The free end of each arm 94 overlies a portion of the oscillating bracket 23, as shown in Fig. 6. When, therefore, an actuating key in any column is depressed and the oscillating bracket 23 in that column raised by the action of the cam 28, the arm 94 in that column will be raised so as to rock the rock-shaft 90 and thereby move the arm 91 out from beneath the lug 92, whereupon the cam 84 and the key-lever 86 will be returned to their normal position by the action of the spring 87. The movement of the cam 84 from beneath the roller 83 will serve to release the cross-bar 79 and thus permit the pawls 62 and 63 to be returned into engaging position by the action of their respective springs 62ª and 63ª. If desired, a spring 95 connected to one of the arms 80 may be employed to return said arms and the cross-bar 79 to their normal position, instead of relying upon the pawl springs 62ª and 63ª for this purpose. With the construction as thus far described, the free ends of the arms 94 would at all times rest upon the engaging portions of the oscillating brackets 23. In order to relieve the friction which would thereby result during key-actuation it is preferable to employ supplemental means for lifting the arm 91 and thereby rocking the rock-shaft 90 far enough to lift the arms 94 slightly out of engagement with the brackets 23. For this purpose the free end of the arm 91 is provided with a cam-surface 96 adapted to be engaged by the corner of the lug 92, as shown in Fig. 5, whereby, as the cam 84 is returned to its normal position, the lug 92, acting upon said cam-surface 96, will serve to turn the arm 91, the rock-shaft 90, and the arms 94 to the desired extent.

It is desirable that, when the numeral-wheel has been returned to 0 and the pawls 62 and 63 released to be returned to engaging position, the pawl 63 will be certain to engage the proper tooth of its ratchet-wheel, instead of resting on the top of such tooth, as might be possible, if means were not provided to prevent it. For the purpose of insuring the engagement of said pawl 63 with the proper tooth of its ratchet-wheel at this time the pawl 62 is provided with an offset extension 97, the forward end of which constitutes a pawl 97ª, which is thus located and adapted to engage the teeth of the ratchet-wheel 61. By reason of the fact that said pawl 97ª approaches said ratchet-wheel at a different angle from the pawl 63 the parts may readily be assembled and adjusted so that the pawl 97ª will be certain to engage at least the edge of the proper teeth of the ratchet-wheel 61. If, when the pawl 97ª thus comes into engagement with the tooth of the ratchet-wheel 61, the pawl 63 shall have come into engagement with the top of its tooth, the further movement of the pawl 97ª will, by reason of the direction of such movement, serve to slightly advance the ratchet-wheel 61 sufficiently to cause the pawl 63 to engage the proper tooth of said ratchet-wheel, as shown in Fig. 5.

The means for returning all of the proof dials 40 to 0 by actuating the clearing bar 51 have already been described. It is desirable that when the numeral-wheels 27 are returned to 0 said proof-dials 40 shall also be returned to 0 and without the necessity of operating the clearing bar 51, and means are provided for this purpose. Secured to the cam 84 is a cam 98 adapted to engage an arm 99 projecting from a lever 100 pivoted to the frame at 101. The lower end of said lever 100 is arranged to engage an arm 102 secured to the rock-shaft 49, as shown in Fig. 5. With this construction, when the key-lever 86 is depressed, the cam 98 will operate to turn the lever 100 and thereby to turn the rock-shaft 49, the turning of which rock-shaft will, as before described, serve to withdraw all of the pawls 47, and so that the frames 42 will be oscillated by the action of the springs 52 to rotate the proof-dials 40 in a direction to return the same to 0. With this construction, as will be seen, whenever the key-lever 86 is depressed for the purpose of returning the numeral-wheels 27 to 0, the proof-dials 40 will likewise be returned to 0 and without any manipulation of the clearing bar 51. As will be seen, the engagement of the arm 91 with the underside of the lug 92, which serves to lock the pawls 62 and 63 out of engagement, will also serve by the engagement of the cam 98 with the arm 99 to lock the pawls 47 out of engagement with the teeth 46 at the lower ends of the frames or members 42.

*Subtraction cut-off.*—In machines of this character subtraction is conveniently and commonly performed by the addition of the complementary number, which will give the correct result, provided means are employed for preventing carrying to the numeral-wheel in the next column to the left. For this purpose these machines have heretofore been provided with what are known as subtraction cut-outs or subtraction cut-offs, the purpose of such subtraction cut-offs being to prevent the operation of the carrying mechanism in the proper column. In the present machine a subtraction cut-off is provided which is different in principle and mode of operation from any that have heretofore been employed, which will now be described.

As above explained, for the performance of the carrying operation the nine-tooth gear 57 is held against rotation by the engagement of the pin 58 with the slot 56 in the slotted arm 55, said slotted arm 55 being itself at this time held against rotation by the pawls 62, 63, which engage the ratchet-wheels 60, 61, and the carrying operation is performed by the action of the carrying spring 68, which serves to rotate the carrying shaft, and by the action of the eccentric head 65 to shift said nine-tooth gear, and so as to carry the axis of said nine-tooth gear around the axis of the numeral-wheel and thus to rotate the numeral-wheel of next higher order one step. When now the performance of the carrying operation is to be prevented, this may be done by holding the numeral-wheel of higher order against turning and releasing the ratchet-wheels 60 and 61 and thereby releasing the nine-tooth gear so that the same will be free to turn, and so that, when the carrying spring is tripped and released by the passing of the lower numeral-wheel from 9 to 0, the action of said carrying spring and the consequent shifting of the nine-tooth gear 57, instead of serving to turn the numeral-wheel one step, will serve to turn said nine-tooth gear one step backward, thereby preventing the performance of the carrying operation. In the present construction, therefore, means are provided whereby when desired the numeral-wheel may thus be prevented from turning and the nine-tooth gear at the same time released so as to be free to turn backward.

Figure 11:
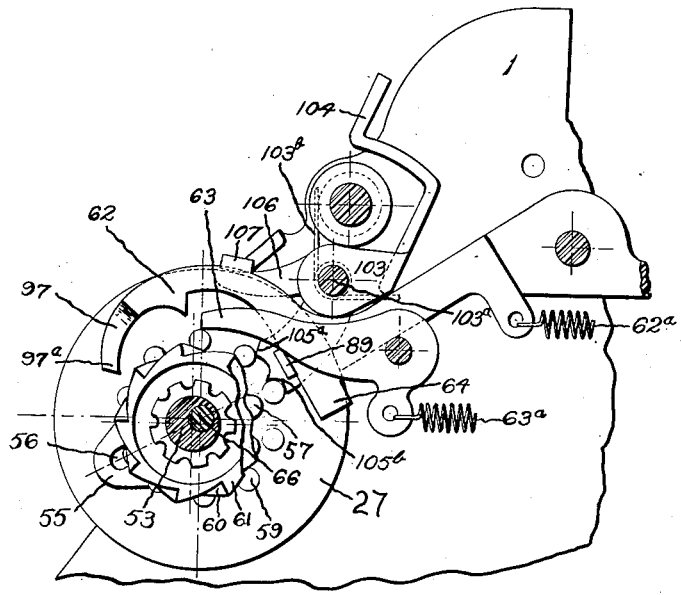
Fig. 11 is a section on the line 11—11 of Fig. 7, and showing a subtraction cut-off mechanism.

Referring to Figs. 1, 8 and 11, a series of subtraction cut-off levers are employed, one for each column of the machine above the units column. Each of these subtraction cut-off levers is in the form of a three-arm lever 103 pivoted at 103$^a$. One arm 104 of said cut-off lever is arranged to extend through an opening in the frame of the machine, by means of which the cut-off lever may be manipulated by the operator. The arm 105 is arranged to engage the pins 59 on the numeral-wheel 27, while the arm 106 is arranged to underlie and engage a lug 107 on the pawl 62, as shown in Fig. 11. With this construction when the arm 104 of the cut-off lever is depressed by the operator, the arm 106 will be raised, thereby lifting the pawl 62 out of engagement with its ratchet-wheel and the lifting of said pawl 62 will, by the engagement of the lug 89 thereon with the pawl 63, serve to lift said pawl 63 out of engagement with its ratchet-wheel. In this connection it may be noted that while it is preferable to lift both of the pawls 62 and 63 out of engagement with their ratchet-wheels at this time, it would be sufficient if only the pawl 63 were so lifted out of engagement, because in connection with preventing the carrying operation from taking place by the action of the subtraction cut-off it is simply necessary that the nine-tooth gear 57 should be free to rotate in a backward direction. While the pawl 97$^a$ carried by the pawl 62 also engages the ratchet-wheel 61, the shape of said pawl 97$^a$ is such that, if said ratchet-wheel is otherwise free to turn backward, said ratchet-wheel may be so turned, because in turning backward said ratchet-wheel will act to automatically lift out of engagement the pawl-tooth 97$^a$.

It will be understood that the unlocking of the ratchet-wheels 60 and 61 by the movement of the pawls 62 and 63 out of engagement therewith serves to release the slotted arm 55 and thus to free the nine-tooth gear 57, so that the same may be turned for the purpose above explained. Preferably the arm 105 is made sufficiently wide to engage two of the teeth 59, as shown in Fig. 11, and said arm 105 is provided with two engaging surfaces 105$^a$ and 105$^b$. The form of the engaging surface 105$^a$ is such that, when said surface engages one of the pins 59, it will serve to impart a slight forward rotation to the numeral-wheel 27 and to the ratchet-wheels 60 and 61, so as thereby to insure that, when the pawl 63 is released, it will be certain to engage the proper tooth of the ratchet-wheel 61, instead of dropping on top of such tooth. Said engaging surface 105$^a$ also serves to hold the numeral-wheel against backward rotation, while the engaging surface 105$^b$ serves to hold the numeral-wheel against forward rotation, all as shown in Fig. 11. A spring 103$^b$ surrounding the pivot 103$^a$ and having one end engaging a fixed part of the frame and the other engaging the cut-off lever 103 serves to return said cut-off lever to its normal position.

With this construction, therefore, whenever the arm 104 of one of the subtraction cut-off levers is depressed, the numeral-wheel in that column will be held against rotation in either direction, while the nine-tooth gear 57 will be free to be turned in a backward direction by the shifting movement thereof under the action of the carrying spring. Consequently, whenever the arm 104 of one of the subtraction cut-off levers is so depressed, the operation of carrying to the numeral-wheel in that column will be prevented. It will be understood that the backward turning of the nine-tooth gear one step will, by reason of the pin and slot connection, serve to turn the slotted arm 55 and consequently the ratchet-wheels 60 and 61 one step backward. This, however, has no operative function, but is merely the result of the backward turning of the nine-tooth gear.

While it is preferred to provide means actuated by the subtraction cut-off for positively holding the numeral-wheel against forward rotation when carrying is to be prevented, in a machine constructed as shown, and in which one end of the carrying spring is connected to the numeral-wheel, it is not necessary that the numeral-wheel should be so held against forward rotation, because the carrying spring so connected to the numeral-wheel will serve to prevent the numeral-wheel from rotating in a forward direction when the carrying actuator is released so that it will be free to be moved backward by the carrying spring.

The subtraction cut-off arrangement above described may also be employed in connection with the planetary gear carrying mechanism of my Patent, No. 1,011,156, hereinbefore referred to, in which case the carrying operation may likewise be prevented by locking or holding the numeral-wheel and by unlocking or releasing the ratchet-wheels and the connected planetary gear mechanism, whereby the planetary gear mechanism will be free to be rotated by the action of the carrying spring.

Referring to Figs. 26, 27 and 28, $26^a$ is the pinion through which the numeral-wheel $27^a$ is rotated. Said pinion $26^a$, instead of being rigidly connected to the numeral-wheel, is connected therewith through a system of gearing in the form of sun and planet gears. The sun gear 108 is mounted on the hub of the pinion $26^a$, so as to rotate therewith.

109 is what may be termed a sustaining gear upon which the planet gears 110 are mounted, said sustaining gear being rotatably mounted on the hub of the pinion $26^a$. Preferably there are three of these planet gears, but a greater or less number may be employed as desired. Each of these planet gears is a double gear, that is, each comprises two sets of gear-teeth, one set being adapted to be engaged by the sun-gear and the other set being adapted to engage gear-teeth on the numeral-wheel. These planet gears are rotatable upon studs $110^b$ secured to the sustaining gear 109. The numeral-wheel $27^a$ is provided with gear-teeth 111 adapted to be engaged by one set of gear-teeth of the planetary gears. Secured to the opposite end of the hub of the pinion $26^a$ are two ratchet-wheels $60^a$ and $61^a$, the teeth of which are oppositely arranged. The ratchet-wheel $60^a$ is adapted to be engaged by the pawl $62^a$ to prevent forward rotation of the numeral-wheel, while the ratchet-wheel $61^a$ is adapted to be engaged by the pawl $63^a$ to prevent backward rotation of said numeral-wheel. The pinion 129 meshes with the sustaining gear 109, said pinion 129 being adapted to be operated by the carrying spring and constituting a part of the carrying mechanism, as more fully described in my prior patent referred to.

As will be seen, the planet gear 110 constitutes an operating member, which is common to both the key actuating mechanism and the carrying mechanism, and which thus corresponds to the shifting gear in the construction hereinbefore described. As will be further understood, there are likewise in the present case two actuators for said planet gear or operating member, viz., the sub-gear, which in the construction shown is to be actuated by the key mechanism, and the sustaining gear, which is operated by the carrying mechanism. As stated in my prior patent referred to, the arrangement in this respect may be reversed and the sustaining gear arranged to be rotated by the key mechanism, and the sun gear to be rotated by the carrying mechanism.

In applying the subtraction cut-off to this planetary gear arrangement, the same principle and mode of operation is involved as in the case of the shifting gear arrangement previously described. In other words, in order to prevent carrying to the column at the left in performing subtraction, the numeral-wheel is to be held against rotation and the carrying mechanism is to be released so as to be free to rotate without rotating the numeral-wheel. Means are therefore provided whereby when desired the numeral-wheel may thus be prevented from turning and the carrying mechanism be released so as to operate without turning the numeral-wheel.

As in the shifting gear construction, a series of subtraction cut-off levers are employed, one for each column of the machine above the units column. Each of these subtraction cut-off levers $103^c$ is in the form of a bent lever pivoted at $103^d$. The free end $104^a$ of said cut-off lever is arranged to extend through an opening in the casing of the machine and by means of which the cut-off lever may be manipulated by the operator. Pivoted to the cut-off lever $103^c$ is a supplemental lever $105^c$, one end of which is provided with a projection $105^d$ adapted to engage the teeth 111 of the numeral-wheel and thereby hold said numeral-wheel against rotation. In order, however, to insure that the pawl $63^a$ when disengaged from its ratchet-wheel $61^a$ as hereinafter described shall be sure to subsequently engage the proper tooth, it is preferred to give a slight rotary movement to the numeral-wheel, so as to correspondingly advance said ratchet-wheel $61^a$ and the movement of the supplemental lever $105^c$ is such that after said lever has engaged the teeth of the numeral-wheel its further movement will serve to impart the desired rotation to said numeral wheel before finally locking the same against rotation. The cut-off lever $103^c$ is provided with an arm $106^a$ which, as the cut-off lever is moved downward, comes into engagement with an arm $63^b$ carried by the pawl $63^a$, the arrangement being such that further depression of the cut-off lever will serve to lift said pawl $63^a$ out of engagement with its ratchet wheel, thereby releasing said ratchet-wheels and permitting the sun-gear, and consequently the planet-gears, to be rotated backward, and so that the numeral-wheel will not be rotated by the operation of the carrying mechanism. Preferably means are provided for limiting the downward movement of the cut-off lever. For this purpose the opposite end $105^e$ of the supplemental lever $105^c$ is provided with a lug $105^f$ arranged to overlie the cut-off lever, and so that as the cut-off lever is depressed said lug will be brought into engagement with the cut-off lever. With the opposite end of the supplemental lever in engagement with the teeth of the numeral-wheel such engagement of said lug with the cut-off lever will prevent further turning of the supplemental lever and consequently prevent further downward movement of the cut-off lever.

A spring 108ª is connected at one end to a fixed part of the frame and the other end to the lug 105ᶠ on the supplemental lever. Said spring 108ª serves to return the supplemental lever and the main lever to their normal positions. For this purpose the supplemental lever is provided with a shoulder 105ᵍ adapted to engage a lug 103ᵉ on the cut-off lever, and so that the action of the spring 108ª in returning the supplemental lever to its normal position will serve to lift the main cut-off lever and move the same up against a fixed part of the frame, as shown in Fig. 26.

As will be seen, the principle and mode of operation of the subtraction cut-off in holding the numeral-wheel against rotation, and in releasing the carrying mechanism so that the same will be free to be rotated without rotating the numeral-wheel, is the same in the case of the planetary gear arrangement as in the case of shifting gear arrangement, and the error in subtraction, which would otherwise occur, will be prevented in the same manner in both cases.

What I claim as my invention and desire to secure by Letters Patent is:

1. A calculating machine having, in combination, a numeral-wheel and a gear for rotating said numeral-wheel, said gear being adapted to be rotated about its own axis and being also adapted to have its axis carried around the axis of the numeral-wheel without rotating said gear.

2. A calculating machine having, in combination, a numeral-wheel and a gear for rotating said numeral-wheel, said gear being adapted to be rotated about its own axis by the operation of an actuator and being adapted to have its axis carried around the axis of the numeral-wheel by the operation of carrying mechanism without rotating said gear.

3. A calculating machine having, in combination, a numeral-wheel, a gear for rotating said numeral-wheel, an actuator for rotating said gear about its own axis, and a carrying mechanism for carrying the axis of said gear around the axis of the numeral-wheel without rotating said gear.

4. A calculating machine having, in combination, a numeral-wheel, a gear for rotating said numeral-wheel, means for rotating said gear about its own axis, and means for carrying the axis of said gear around the axis of the numeral-wheel without rotating said gear.

5. A calculating machine having, in combination, a numeral-wheel, a gear for rotating said numeral-wheel, means for rotating said gear about its own axis, and means embodying a spring for carrying the axis of said gear around the axis of the numeral-wheel without rotating said gear.

6. A calculating machine having, in combination, a numeral-wheel, a shifting gear for rotating said numeral-wheel, means for rotating said gear about its own axis, and means for shifting said gear to carry the axis thereof away from and toward and also around the axis of the numeral-wheel.

7. A calculating machine having, in combination, a numeral-wheel, a shifting gear for rotating said numeral-wheel, means for rotating said gear about its own axis, and means embodying a spring for shifting said gear to carry the axis thereof away from and toward and also around the axis of the numeral wheel.

8. A calculating machine having, in combination, a numeral-wheel, a shifting gear for rotating said numeral-wheel, an actuator for rotating said gear about its own axis, and a carrying mechanism for shifting said gear to carry the axis thereof away from and toward and also around the axis of the numeral wheel.

9. A calculating machine having, in combination, a numeral-wheel provided with teeth, a gear engaging the teeth of said numeral-wheel, means for rotating said gear about its own axis, and means for carrying the axis of said gear around the axis of the numeral-wheel without rotating said gear to advance said numeral wheel one step.

10. A calculating machine having, in combination, a numeral-wheel provided with teeth, a gear engaging the teeth of said numeral-wheel, means for rotating said gear about its own axis, and means embodying a spring for carrying the axis of said gear around the axis of the numeral-wheel without rotating said gear to advance said numeral-wheel one step.

11. A calculating machine having, in combination, a numeral-wheel, a driving pinion therefor, and connections between said numeral-wheel and said driving pinion embodying a gear shifted to carry the axis thereof away from and toward and also around the axis of the numeral wheel.

12. A calculating machine having, in combination, a numeral-wheel, a driving pinion therefor, and connections between said numeral-wheel and said driving pinion embodying a gear engaging said numeral-wheel and movable to carry the axis thereof away from and toward and also around the axis of the numeral wheel and an arm secured to said driving pinion and connected to said gear.

13. A calculating machine having, in combination, a numeral-wheel, a driving pinion therefor, and connections between said numeral-wheel and said driving pinion embodying a gear engaging said numeral-wheel and movable to carry the axis thereof away from and toward and also around the axis of the numeral wheel and an arm secured to said driving pinion, said arm being provided with a slot to receive a pin projecting from said gear.

14. A calculating machine having, in combination, a numeral-wheel, a gear for rotating said numeral-wheel, means for rotating said gear about its own axis, and an eccentric for carrying the axis of said gear around the axis of the numeral-wheel.

15. A calculating machine having, in combination, a numeral-wheel, a gear for rotating said numeral-wheel, means for rotating said gear about its own axis, an eccentric for carrying the axis of said gear around the axis of the numeral-wheel, and a spring for operating said eccentric.

16. A calculating machine having, in combination, a numeral-wheel, a gear for rotating said numeral-wheel, means for rotating said gear about its own axis, an eccentric for carrying the axis of said gear around the axis of the numeral-wheel, and a spring for operating said eccentric, said spring being put under tension by the rotation of the numeral-wheel of next lower order.

17. A calculating machine having, in combination, a numeral-wheel, a driving pinion therefor, a segment gear for operating said pinion, said segment gear being formed on a member of open-truss construction and provided with eight internal stop-teeth and a pawl for engaging one or the other of said teeth, one of the radial arms of said truss-member serving as the ninth tooth to be engaged by said pawl.

18. A calculating machine having, in combination, a numeral-wheel, a gear for rotating said numeral-wheel, an eccentric for carrying the axis of said gear around the axis of the numeral-wheel, and means controlled by the numeral-wheel of next lower order for rotating said eccentric.

19. A calculating machine having, in combination, a numeral-wheel, a gear for rotating said numeral-wheel, an eccentric for carrying the axis of said gear around the axis of the numeral-wheel, and means brought into operation by the passage of the numeral-wheel of next lower order from 9 to 0 for rotating said eccentric.

20. A calculating machine having, in combination, a numeral-wheel, a gear for rotating said numeral-wheel, an eccentric for carrying the axis of said gear around the axis of the numeral-wheel, a spring for rotating said eccentric, and means whereby said spring will be put under tension by the rotation of the numeral-wheel of next lower order and will be tripped to operate said eccentric when said nemeral-wheel of next lower order passes from 9 to 0.

21. A calculating machine having, in combination, a numeral-wheel, a shifting gear for rotating said numeral-wheel, and a driving pinion for rotating said shifting gear, the axis of said shifting gear being in line with the axis of said driving pinion for key-actuation.

22. A calculating machine having, in combination, a numeral-wheel, a shifting gear for rotating said numeral-wheel, a driving pinion for rotating said shifting gear, the axis of said shifting gear being in line with the axis of said driving pinion for key-actuation, and means for moving the axis of said shifting gear out of line with the axis of said driving pinion for carrying.

23. A calculating machine having, in combination, a numeral-wheel, a shifting gear for rotating said numeral-wheel, a driving pinion for rotating said shifting gear, the axis of said shifting gear being in line with the axis of said driving pinion for key-actuation, and a shaft provided with an eccentric for moving the axis of said shifting gear out of line with the axis of said driving pinion for carrying.

24. A calculating machine having, in combination, a numeral-wheel, a shifting gear for rotating said numeral-wheel, a shaft provided with an eccentric head upon which said shifting gear is mounted, said shaft being eccentrically mounted in its support.

25. A calculating machine having, in combination, a numeral wheel, a shifting gear for rotating said numeral-wheel, a shaft provided with an eccentric head upon which said shifting gear is mounted, said shaft being eccentrically mounted in its support, these two eccentricities being equal and off-setting each other when the parts are in position for key-actuation.

26. A calculating machine having in combination a numeral-wheel, a shifting gear for rotating said numeral-wheel, a shaft provided with an eccentric head upon which said shifting gear is mounted, and a driving pinion for rotating said shifting gear, said shaft being mounted eccentric to said driving pinion.

27. A calculating machine having, in combination, a numeral-wheel, a shifting gear for rotating said numeral-wheel, a shaft provided with an eccentric head upon which said shifting gear is mounted, and a driving pinion for rotating said shifting gear, said shaft being mounted eccentric to said driving pinion, these two eccentricities being equal and off-setting each other when the parts are in position for key-actuation.

28. A calculating machine having, in combination, a numeral-wheel, a shifting gear for rotating said numeral-wheel, a shaft provided with an eccentric head upon which said shifting gear is mounted, a driving pinion for rotating said shifting gear, and a support in which said shaft is mounted eccentrically and on which said driving pinion is mounted concentrically.

29. A calculating machine having, in combination, a numeral-wheel, a shifting gear for rotating said numeral-wheel, a shaft provided with an eccentric head upon which said shifting gear is mounted, a driving pinion for rotating said shifting gear and a support in which said shaft is mounted eccentrically and on which said driving pinion is mounted concentrically, the two eccentricities referred to being equal and offsetting each other when the parts are in position for key-actuation.

30. A calculating machine having, in combination, a series of numeral-wheels, a series of keys for actuating each of said numeral-wheels, a spring operating in connection with each of said numeral-wheels and tending to turn said numeral-wheel backward, means for normally holding each numeral-wheel against backward rotation under the action of said spring, means for releasing said holding means, and a stop for arresting each numeral-wheel when it has been brought to zero by the action of said spring.

31. A calculating machine having, in combination, a series of numeral-wheels, a series of keys for actuating each of said numeral-wheels, a spring operated in connection with each of said numeral-wheels and tending to turn said numeral-wheel backward, means for normally holding each numeral-wheel against backward rotation under the action of said spring, means for releasing such holding means, and means for retaining said holding means in released position until the numeral-wheels have been returned to zero.

32. A calculating machine having, in combination, a series of numeral-wheels, a series of keys for actuating each of said numeral-wheels, a spring operated in connection with each of said numeral-wheels and tending to turn said numeral-wheel backward, means for normally holding each numeral-wheel against backward rotation under the action of said spring, means for releasing said holding means, and means for retaining said holding means in released position until the next depression of an actuating key.

33. A calculating machine having, in combination, a series of numeral-wheels, a series of keys for actuating each of said numeral-wheels a spring operated in connection with each of said numeral-wheels and tending to turn said numeral-wheel backward, means for normally holding each numeral-wheel against backward rotation under the action of said spring, means for releasing said holding means, and means for retaining said holding means in released position until the next depression of any actuating key in any column.

34. A calculating machine having, in combination, a series of numeral-wheels, a series of keys for actuating each of said numeral-wheels, clearing mechanism embodying a spring adapted to return each numeral-wheel to zero, and carrying mechanism adapted to be operated by said spring.

35. A calculating machine having, in combination, a numeral-wheel, a ratchet-wheel connected therewith, a pawl for engaging said ratchet-wheel to prevent backward rotation of said numeral-wheel, means for disconnecting said pawl, means for returning the numeral-wheel to zero, and means for slightly advancing said ratchet-wheel to insure the engagement of said pawl with the proper tooth of said ratchet-wheel after the numeral-wheel has been returned to zero.

36. A calculating machine having, in combination, a numeral-wheel, two ratchet-wheels connected therewith, a pawl for engaging one of said ratchet-wheels to prevent backward rotation of said numeral-wheel, and a pawl for engaging the other ratchet-wheel to prevent forward rotation of said numeral-wheel, means for disengaging said pawls, and means for returning the numeral-wheel to zero, said last-mentioned pawl being provided with an offset adapted to engage and advance said first-mentioned ratchet-wheel to insure the engagement of its pawl with the proper tooth thereof after the numeral-wheel has been returned to zero.

37. A calculating machine having, in combination, a series of proof-dials, springs tending to return said proof-dials to zero, means normally preventing the turning of said proof-dials under the action of said spring, means for releasing said holding means, and means for retaining said holding means in released position until said proof-dials have been returned to zero.

38. A calculating machine having, in combination, a series of proof-dials, springs tending to return said proof-dials to zero, means normally preventing the turning of said proof-dials under the action of said springs, means for releasing said holding means, and means for retaining said holding means in released position until the next depression of an actuating key.

39. A calculating machine having, in combination, a series of proof-dials, springs tending to return said proof-dials to zero, means normally preventing the turning of said proof-dials under the action of said springs, means for releasing said holding means, and means for retaining said holding means in released position until the next actuation of any key in any column.

40. A calculating machine having, in combination, a numeral-wheel, a member for operating said numeral-wheel, two actuators each adapted to rotate the numeral-wheel through said operating member, means for holding one of said actuators when the numeral-wheel is to be rotated by the other, and means for releasing said actuator, whereby said actuator will be free to be moved backward and the rotation of the numeral-wheel thereby prevented.

41. A calculating machine having, in combination, a numeral-wheel, a member for operating said numeral-wheel, two actuators each adapted to rotate the numeral-wheel through said operating member, one of said actuators being adapted to effect carrying, means for holding the other actuator when the carrying actuator is actuated to effect carrying, and means for releasing said actuator to permit said carrying actuator to be actuated without imparting rotation to the numeral-wheel.

42. A calculating machine having, in combination, a numeral-wheel, a member for operating said numeral-wheel, two actuators each adapted to rotate the numeral-wheel through said operating member, one of said actuators being adapted to effect carrying, means for holding the other actuator when the carrying actuator is actuated to effect carrying, and a subtraction cut-off for releasing said actuator to permit said carrying actuator to be actuated without imparting rotation to the numeral-wheel.

43. A calculating machine having, in combination, a series of numeral-wheels, a member for operating each of said numeral-wheels, two actuators each adapted to rotate a numeral-wheel through the operating member therefor, means for holding one of the actuators for a numeral-wheel when said numeral-wheel is to be rotated by the other, and means for releasing said actuator, whereby said actuator will be free to be moved backward and the rotation of its numeral-wheel thereby prevented.

44. A calculating machine having, in combination, a series of numeral-wheels, a member for operating each of said numeral-wheels, two actuators each adapted to rotate a numeral-wheel through the operating member therefor, one of said actuators being adapted to effect carrying, means for holding the other actuator when the carrying actuator is actuated to effect carrying, and means for releasing said actuator to permit said carrying actuator to be actuated without imparting rotation to the numeral-wheel.

45. A calculating machine having, in combination, a series of numeral-wheels, a member for operating each of said numeral-wheels, two actuators each adapted to rotate a numeral-wheel through the operating member therefor, one of said actuators being adapted to effect carrying, means for holding the other actuator when the carrying actuator is actuated to effect carrying, and a subtraction cut-off for releasing said actuator to permit said carrying actuator to be actuated without imparting rotation to the numeral-wheel.

46. A calculating machine having, in combination, a numeral-wheel, a shifting gear for operating said numeral-wheel, two actuators each adapted to rotate said numeral-wheel through said shifting gear, means for holding one of said actuators when the numeral-wheel is to be rotated by the other, and means for releasing said actuator, whereby said actuator will be free to be moved backward and the rotation of the numeral-wheel thereby prevented.

47. A calculating machine having, in combination, a numeral-wheel, a shifting gear for operating said numeral-wheel, two actuators each adapted to rotate the numeral-wheel through said shifting gear, one of said actuators being adapted to effect carrying, means for holding the other actuator when the carrying actuator is actuated to effect carrying, and means for releasing said actuator to permit said carrying actuator to be actuated without imparting rotation to the numeral-wheel.

48. A calculating machine having, in combination, a numeral-wheel, a shifting gear for operating said numeral-wheel, two actuators each adapted to rotate the numeral-wheel through said shifting gear, one of said actuators being adapted to effect carrying, means for holding the other actuator when the carrying actuator is actuated to effect carrying, and a subtraction cut-off for releasing said actuator to permit said carrying actuator to be actuated without imparting rotation to the numeral-wheel.

49. A calculating machine having, in combination, a numeral-wheel, a member for operating said numeral-wheel, two actuators each adapted to rotate the numeral-wheel through said operating member, and means for holding and releasing said operating member.

50. A calculating machine having, in combination, a numeral-wheel, a member for operating said numeral-wheel, two actuators each adapted to rotate the numeral-wheel through said operating member, one of said actuators being adapted to effect carrying, means for holding said operating member, and means for releasing said operating member to prevent carrying to said numeral-wheel.

51. A calculating machine having, in combination, a numeral-wheel, a member for operating said numeral-wheel, two actuators each adapted to rotate the numeral-wheel through said operating member, one of said actuators being adapted to effect carrying, means for holding said operating member when carrying is to be effected, and means for releasing said operating member when carrying is to be prevented.

52. A calculating machine having, in combination, a numeral-wheel, a shifting gear for operating said numeral-wheel, two actuators each adapted to rotate the numeral-wheel through said shifting gear, and means for holding and releasing said shifting gear.

53. A calculating machine having, in combination, a numeral-wheel, a shifting gear for operating said numeral-wheel, two actuators each adapted to rotate the numeral-wheel through said shifting gear, one of said actuators being adapted to effect carrying, means for holding said shifting gear, and means for releasing said shifting gear to prevent carrying to said numeral-wheel.

54. A calculating machine having, in combination, a numeral-wheel, a shifting gear for operating said numeral-wheel, two actuators each adapted to rotate the numeral-wheel through said shifting gear, one of said actuators being adapted to effect carrying, means for holding said shifting gear when carrying is to be effected, and means for releasing said shifting gear when carrying is to be prevented.

GEORGE C. CHASE.

Witnesses:
  W. H. Thurston,
  J. H. Thurston.